United States Patent

[11] 3,588,847

[72] Inventors Harold R. Dell
Palo Alto;
Judit K. Florence, Menlo Park, Calif.
[21] Appl. No. 814,744
[22] Filed Apr. 9, 1969
[45] Patented June 28, 1971
[73] Assignee Singer-General Precision, Inc.
Binghamton, N.Y.

[54] AUTOMATIC FIRST-IN FIRST-OUT SYSTEM
8 Claims, 2 Drawing Figs.

[52] U.S. Cl. .......... 340/173R, 340/174SR
[51] Int. Cl. .......... G11c 19/00, G11c 7/00
[50] Field of Search .......... 340/173, 174; 307/221

[56] References Cited
UNITED STATES PATENTS

| | | | |
|---|---|---|---|
| 3,117,307 | 1/1964 | Davie | 340/173 |
| 3,126,524 | 3/1964 | Blocher, Jr. | 340/173 |
| 3,493,939 | 2/1970 | Dunn et al. | 340/173 |

*Primary Examiner*—Stanley M. Urynowicz, Jr.
*Attorneys*—Francis L. Masselle, William Grobman and Andrew G. Pullos

ABSTRACT: In information systems which serve a plurality of requestors upon request, means must be provided for storing the identification of the requesting apparatus in a priority system. One such priority system can be considered a chronological system received which the first request in is the first request filled. The system of this invention provides such a facility. Each request or requestor is identified by a digital code. When the requestor makes a request, its code is stored in the first register of a bank or registers. The next job to be performed is identified from the information stored in the last register in the bank of registers. This apparatus provides a system of gates for sensing when a register contains zeros or contains the identification of a requestor. At each cycle the requestor identification is shifted to the last register in the bank which contains only zeros, and is thereafter stepped into the next register as that becomes empty. Thus, all information which identifies requesting organizations is moved into the last register of the bank of registers. As each request is filled, the last register is cleared to zeros, permitting information stored in the next-to-the-last register to be shifted into the last register.

INVENTORS
HAROLD R. DELL
JUDIT K. FLORENCE

BY William Grotman

INVENTORS
HAROLD R. DELL
JUDIT K. FLORENCE
BY

AUTOMATIC FIRST-IN FIRST-OUT SYSTEM

This invention relates to automatic apparatus for storing and sorting requests so that they may be filled in the order that they are received.

In systems where a central unit must serve a plurality of peripheral organizations, each organization may request the use of the central unit at any time. Obviously, the central unit cannot interrupt the task it is performing each time a new request is received. Means must be provided for storing the requests so that they can be filled in sequence. One such sequence is a chronological one in which the first request received is the first request that is filled. Since the requested tasks may be of varying durations, the storage system must be able to store, in the proper order, a large number of request identifications.

In many prior art systems request identifications are stored in cyclically operating memory systems. The requesting identification is, therefore, stored in what can be considered a random pattern which depends upon the time of receipt of the request in the memory operating cycle. Apparatus has to be provided for identifying the individual priority of each request. In a chronological system this means that the requesting identifications have to be further identified by the order in which they are received. As one request is filled, a search of the memory system is made to compare the remaining requests for service so as to determine which is the next in line.

Systems utilizing this type of priority allocation can be, for example, central processing systems such as computers having a plurality of data links connecting the central system with several remote stations. Each station can request the use of the central system to solve a problem having a greater or less duration. The system of this invention provides a means for storing the requests so that they are automatically filled in chronological order of receipt.

It is an object of this invention to provide a new and improved apparatus for allocating priorities.

It is another object of this invention to provide a new and improved system for insuring the filling of requests for service in an established pattern.

It is a further object of this invention to provide a new and improved system for storing requests for service and for automatically providing identification of the next request to be filled.

Other objects and advantages of this invention will become apparent as the following description proceeds, which description should be considered together with the accompanying drawings in which.

Figure 1:
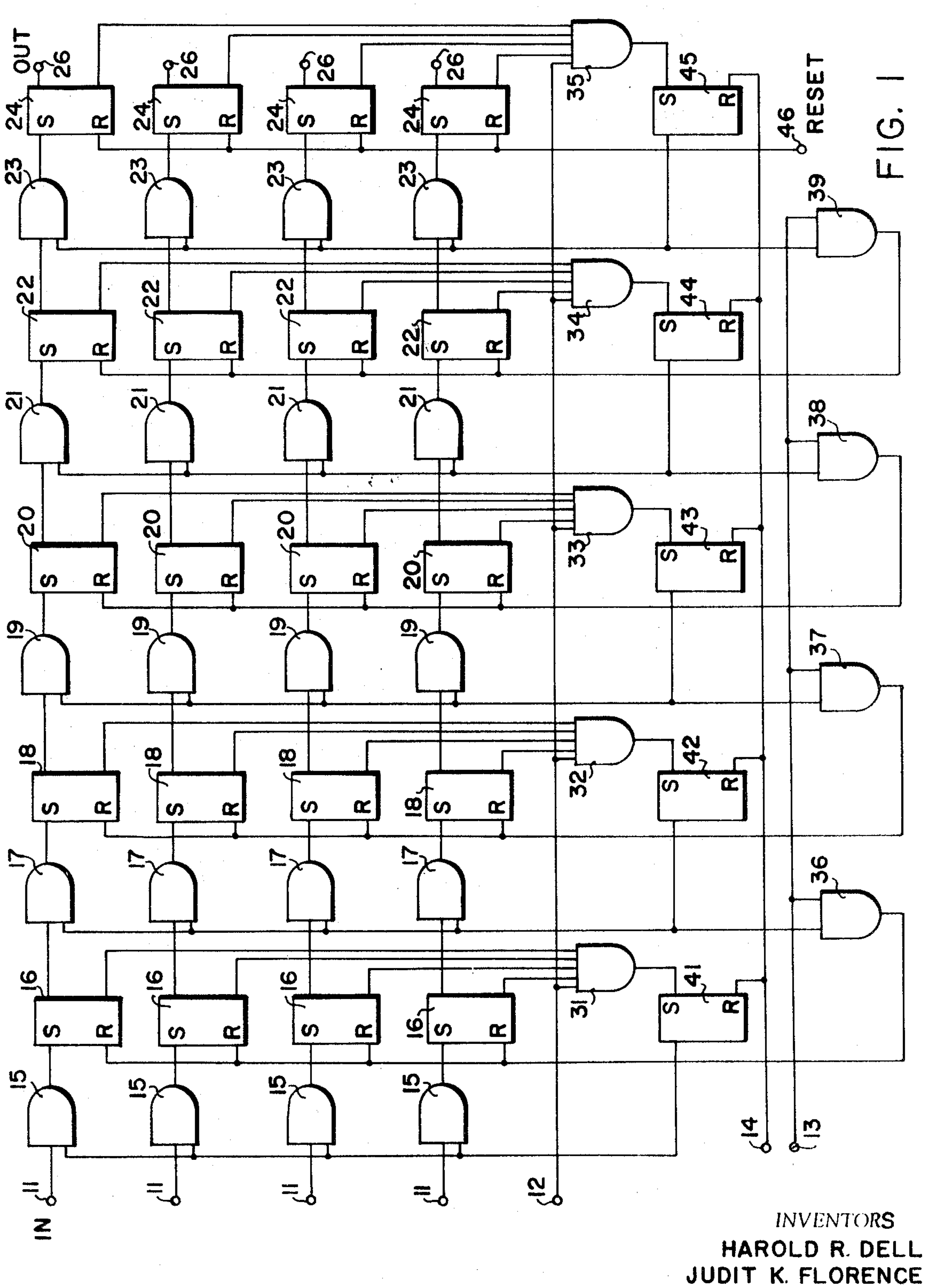
FIG. 1 is a logical block diagram of one embodiment of this invention.

Referring now to the drawings in detail and more particularly to FIG. 1, the reference character 11 designates a plurality of data input terminals. Each input terminal can be adapted to receive a single bit of a digital word. Each of the input terminals 11 is connected to one input of a two input gate 15, the output of which is applied to the set input of a flip-flop 16. In the example shown in FIG. 1, four flip-flops 16 are shown for storing four bits of information which identify may of a plurality of requesting stations. The bank of registers shown in FIG. 1 comprises a first register having four flip-flops 16, a second register of four flip-flops 18, a third register of four flip-flops 20, a fourth register of flip-flops 22, and a last register of flip-flops 24. Thus, the system shown in FIG. 1 is adapted to store five requests, each of which is identified by a 4-bit word. Of course, this system is for illustration only, and the storage device of this invention can be expanded to include any number of individual registers, each of which may comprise any desired number of flip-flops. The set output from each flip-flop 16 is applied as one input to a transfer gate 17 of a bank of transfer gates whose individual outputs serve as the set inputs to the flip-flops 18. In turn, each of the set outputs of the flip-flops 18 serve as one input to individual gates 19 of a bank of transfers gates which transfer the information to flip-flops 20. This arrangement continues with the outputs of the flip-flops 20 providing inputs for gates 21 whose outputs set flip-flops 22. The set outputs of the flip-flops 22 serve as inputs for gates 23 whose outputs set the flip-flops 24. Thus, for each register of flip-flops 16, 18, 20, 22 and 24, there is a corresponding bank of transfer gates 15, 17, 19, 21 and 23. The set output of a flip-flop will provide one input for a transfer gate, and the other input of the transfer gate is derived from a sensing gate that detects the all-zero condition of the register. The bank of flip-flops 16 have a sensing gate 31, the flip-flops 18 have a sensing gate 32, the flip-flops 20 having a sensing gate 33, the flip-flops 22 have a sensing gate 34, and the flip-flops 24 have a sensing gate 35. The sensing gate 31 has one input from each of the reset outputs of the flip-flops 16 and also an input from an input terminal 12 which can be considered a phase 1 input. In a similar manner, the phase 1 input terminal 12 is connected to one input of each of the other sensing gates 32, 33, 34 and 35. The other inputs to each of these gates comprise the individual reset outputs from its appropriate bank of flip-flops. In addition to the sensing gates 31—35, the system of FIG. 1 includes sensing flip-flops 41, 42, 43, 44 and 45, the set output of each of which is applied as one input to a reset gate 36, 37, 38 and 39. The other input to each of the reset gates 36—39 is connected to a phase 2 input terminal 13. A phase 3 input terminal 14 is connected to the reset inputs of the flip-flops 41—45. The output from the system of FIG. 1 is derived at output terminals 26 connected to the set outputs of flip-flops 24.

In operation, the identification code of a requesting facility is applied to the input terminals 11. Assume for this discussion that before any information is applied to the input terminals 11, the entire bank of registers 16, 18, 20, 22 and 24 is cleared to zero. In this condition, four of the five inputs to each of the gates 31, 32, 33, 34 and 35 are energized. The first identification code is then applied to the terminals 11. When the first phase 1 pulse arrives at the terminal 12, it opens all of the gates 31—35, and the output from each of these gates sets the flip-flops 41, 42, 43, 44 and 45. A conditioning signal is thereby applied to one input to each of the transfer gates 15, 17, 19, 21 and 23. Since information is already available at the other inputs to some of the gates 15, that information is passed through the gates 15 to set the corresponding flip-flops 16. Setting of the flip-flops 16 applies the second inputs to some of the gates 17, and the information originally applied to the input terminals 11 is passed into the flip-flops 18 to set the appropriate flip-flops of the bank 18. In this manner, the information applied to the input terminals 11 is applied through the registers 16, 18, 20 and 22 and through the transfer gates 15, 17, 19, 21 and 23 until the information reaches the flip-flops 24. The information which was applied at the input terminals 11 then is stored in the flip-flops 24. Assuming, now, that no further information is applied to the input terminals 11 for a period of time, the phase 1 signal is removed from the terminal 12 and is replaced by the phase 2 signal applied to terminal 13. This phase 2 signal is applied as one input to gates 36, 37, 38 and 39 and opens those gates which have another input signal applied from the appropriate flip-flops 41—45. In this case, all of the flip-flops 41—45 were set and apply inputs to the gates 36, 37, 38 and 39. The outputs from the gates 36—39 restore the flip-flops in the registers 16, 18, 20 and 22 to zeros. Then, the phase 2 signal is removed from the input 13 and a phase 3 signal is applied to the input 14. The phase 3 signal restores the flip-flops 41—45, and removes the signals applied to the transfer gates 15, 17, 19, 21 and 23.

When the phase 3 signal is removed from the input terminal 14, the system is ready to receive additional information. This information may not be available for a considerable length of time, but the system cycles anyhow. The phase 1, 2 and 3 signals are cyclically applied to the inputs 12, 13, and 14, and, if no information is applied to the input terminals 11, then none is stored in the system. When another code identification of a facility desiring services is applied to the input terminals 11, the operation is the same as that described above. However, since the register 24 now has information stored in it, the gate 35 is not opened when the phase 1 signal is applied to terminal 12, and the flip-flop 45 remains restored. No signal is then applied to the transfer gates 23, and any information which appears in the register 22 remains there. This operation can continue until the entire bank of registers 16, 18, 20, 22 and 24 are filled. However, in the meantime, the central processor can request information from the system and the information stored in the register 24 is applied to it through the output terminals 26. When the information transfer is performed, the central processor applies a completed signal to the input terminal 46 to clear the register 24. During the next cycle, the gate 35 is opened by the phase 1 signal, and information is transferred from the register 22 to the register 24. Since none of the other registers were empty, no other sensing gate 31—34 opens. The phase 2 signal opens gate 39 which restores the register 22 to zero, and the phase 3 signal restores the flip-flop 45. Since the register 22 is now empty, the information stored in the register 20 is now transferred to the register 22 on the following cycle in the same manner, and the information progresses through the system until the register 16 is empty. Additional information can then be stored in register 16. In this manner, the system accomplishes its purpose to store information which can be retrieved in the order received.

Figure 2:
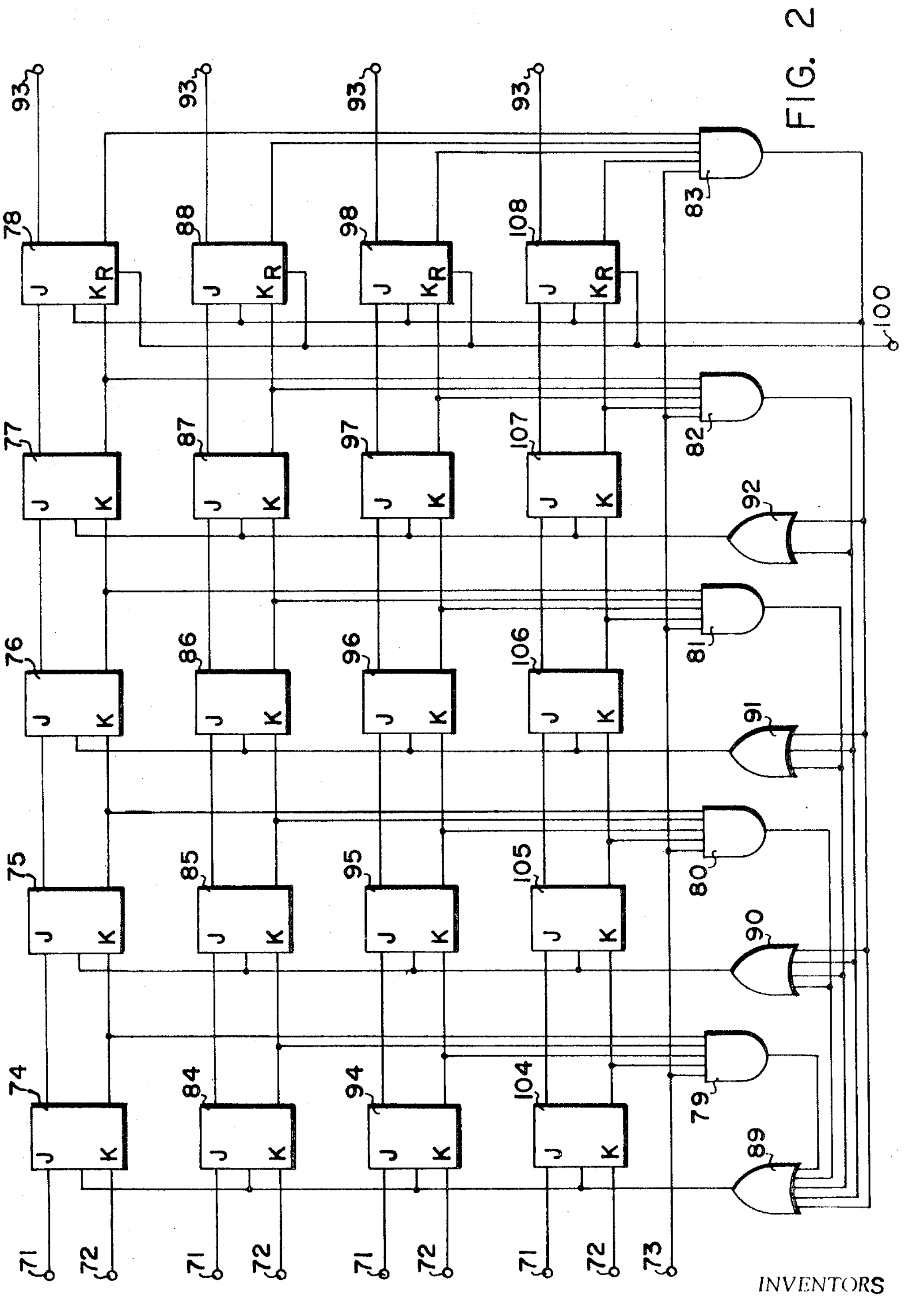
FIG. 2 is a logical block diagram of a second embodiment of a system in accordance with this invention.

FIG. 2 shows, in logical block form, a second embodiment of the invention described above. In the system of FIG. 2 clocked JK flip-flops are employed instead of the set-reset type. These flip-flops change state at the trailing edge of the clock pulse and their final state depends on the signals on the J and K input prior to the trailing edge of the clock. The logical operation of a JK flip-flop can be described by a truth table, where $Q_n$ denotes the state of the flip-flops before the trailing edge of the clock pulse and $Q_{n+1}$ after it.

| J | K | $Q_{n+1}$ |
|---|---|---|
| 0 | 0 | $Q_n$ |
| 0 | 1 | 0 |
| 1 | 0 | 1 |
| 1 | 1 | $\overline{Q_n}$ |

The JK flip-flops are used a shift registers in this embodiment by applying complementary signals to the J and K inputs. In the system of FIG. 2, four shift registers of five stages each form the register system. The shift register are comprised of individual stages such as 74, 75, 76, 77 and 78 for one register, 84, 85, 86, 87 and 88 for a second register, 94—98 for a third register, and 104—108 for a fourth register. Each shift register is designated in FIG. 2 by the same tens digit. The individual work registers are formed by the contents of the same order stages of the four different shift registers. For example, the first word register is formed by the contents of the stages 74, 84, 94 and 104; and the second work register is formed by the contents of the stages 75, 85, 95 and 105. Each of the word registers is identified by reference characters having the same units digit. Input terminals 71 and 72 are provided for connection to suitable inputting equipment such as a requestor unit. The terminals 71 are the J terminals for each of the first word register stages 74, 84, 94 and 104; and the terminals 72 are the K terminals for the same stages. Information is applied to the word registers by appropriate voltage levels on both the J and K lines. The outputs from each of the first word register stages, 74—104, are connected to the appropriate inputs to the individual stages of the second word register, 76—105, whose outputs are similarly connected to the inputs of the third register, 76—106, and so on. The last word register formed of stages 78, 88, 98 and 108 is provided with output terminals 93 from which information may be taken by the central unit. As shown in FIG. 2 and described above, the system of this FIG. is arranged to store information of five separate requestors, the information which identifies each requestor comprising a word having four bits. Each of the word registers has its own sensing gate 79, 80, 81, 82 and 83. Each of these gates 79—83 has five inputs, four of which sense the all zero condition of that particular register. For example, the inputs to the gate 79 are connected to the restore outputs of the stages 74, 84, 94 and 104. The fifth input to the gate 79, and to all of the gates 79, 80, 81, 82 and 83 is applied from a clock input terminal 73. The input terminal 73 is provided for connection to any suitable source of clock pulses. Similarly, the gates 80—83 have four of their inputs connected to the restore outputs of the stages of their respective word registers and their fifth input connected to the clock terminal 73. The outputs of AND gates 79—83 are connected to OR gates 89—92. The inputs of gate 89 are connected to the outputs of gates 79—83. The inputs of gate 90 are the outputs of 80—83. Gate 91 has the outputs of 81—83 as inputs, while 92 has 82 and 83. The outputs of gates 89—92 provide shift clock pulses to the word registers. The output of gate 89 is connected to each stage of register 74—104, the output of 90 to each stage 75—105, the output of 91 to stages 76—106, and the output of 92 to stages77—107. The shift clock pulses to the last register 78-—108 is derived directly from the output of gate 83. Terminal 100 is a reset line to the final word register comprised of stages 78—108.

The operation of the embodiment of FIG. 2 is slightly different from that of FIG. 1. Since the system of FIG. 2 utilizes shift registers, the input information is applied simultaneously to both inputs of each stage. Thus, assuming that the first stage 74 is to be set, its input terminal 71 would have a high voltage applied to it and its input terminal 72 would have a low voltage applied to it. In a similar manner, the input information applied to the first word register, 74—104, consists of high potentials and low potentials simultaneously applied to the two input terminals for each stage. Assume for this discussion that the entire system shown in FIG. 2 has been cleared to zero. A word representing a first requestor is now applied to the input terminals 71 and 72. At the same time the clock terminal 73 is connected to a source of clock pulses which are continually recurring at any suitable clock rate. When the next clock pulse arrives at terminal 73, it applies a clock pulse to one input of each of the gates 79—83. Since the entire system has been previously cleared to zero, all of the inputs of the sensing gates 79—83 are high, and the clock pulse passes through each gate. In this case, all of the OR gates 89—92 have this clock pulse applied to all of their inputs. Consequently, a shift or clock pulse is applied to each stage of all of the five word registers. When a clock pulse is applied to the clock inputs to any word register, whatever information appears at the information inputs to that register is transferred into that register. This statement is the basis for understanding the operation of the system of FIG. 2. Thus, after the clock pulse decays, the information representing the first requestor is now in the first word register 74—104, and, since the entire system had originally been cleared to zero, zeros were transferred into all of the subsequent word registers. Assume now that no information appears at the input terminals 71 and 72 for a while. Then for each subsequent clock pulse applied to the terminal 73, the same operation mentioned above takes place; the information appearing at the input to each register stages is transferred into that stage when the clock pulse appears. When the second clock pulse is applied to terminal 73, the information representing the first requestor appears at the outputs of the word register 74—104, and this information is then transferred into the second word register 75—105. At the same time all zeros appear at the inputs to all of the other word register stages so zeros are transferred into those stages in accordance with the truth table set forth earlier. This action, in effect, has cleared the word register 74—104 to zeros. Then, when the third clock pulse is applied to input terminal 73, the information representing the first requestor is transferred into the word register 76—106 and all of the other stages will contain zeros. Assume that at this time a representation of a second requestor is applied to the input terminals 71 and 72. On the next clock pulse this information is transferred into the register 74—104 and the information which was in register 76—106 is transferred into register 77—107.

One more clock pulse and the information representing the first requestor is in the last word register 78—108. Since there are no other registers after that, that information remains there. Two more clock pulses and the information representative of the second requestor is stepped into the register 77—107. At this time neither of the transfer gates 82 or 83 are open when a clock pulse appears since not all of the inputs to each of these gates represent zeros. Therefore, when the next clock pulse is applied to the input terminal 73, it does not pass through the OR gate 92 and no further information is transferred into the register 77—107. It should have been mentioned above that the register 78—108 does not have a clock pulse applied to it when it contains information since the single clock pulse would come from the sensing gate 83 which is closed when the register 78—108 contains information. Supplying representations of additional requestors to the input terminals 71 and 72 causes the operation of the system to proceed as described above until all five word registers are filled. When the central processor requests information representing one of the requestors, it acquires that information from the output terminals 93 and supplies a clear pulse to the input terminal 100. This clears the word register 78—108 to zero, again opening the sensing gate 83. The next clock pulse then passes through the gate 83 and transfers the information from the register 77—107 into the register 78—108. Subsequent clock pulses will then transfer the information from the previous registers one step to the right as shown in FIG. 2. Thus, the system of FIG. 2 operates automatically to supply to a central processor the information representing a plurality of requestors in the order in which that information is received.

This specification has described a new and improved apparatus for automatically receiving information identifying a plurality of requesting stations and to store that information in the order to which it has been received. The system operates automatically to supply the identification information to a central unit or other such system in chronological order and to operate automatically to insure that operations are carried out for the individual requesting units in the order in which such operations were received. It is realized that the above description may indicate to those who are skilled in this art additional ways in which the principles of this invention may be utilized without departing from its spirit. It is, therefore, intended that this invention be limited only by the scope of the appended claims.

I claim:

1. An automatic system for randomly dispensing requests for service in the order in which they are received, said system comprising means for storing information representing a plurality of individual service requests, means for applying information representing requests to the input to said storage means, means for sensing the contents of said storage means, control means responsive to the output of said sensing means for controlling the transfer of information representing requests from the input of said storage means to the output of said storage means, means connected to the output of said storage means for recovering the information representing requests in the order in which they are applied to the input, said storage means comprising a plurality of individual registers, and means for connecting said registers together for the transfer of information from one register to the next, said sensing means comprising a coincidence gate for each register, and means for connecting one input to each gate to the output of an individual stage in a register so that said gate is conditioned to open when all of the stages in a register contain zeros.

2. The system defined in claim 1 wherein said control means comprises means for applying control pulses to another input of each of said sensing gates so that said control pulses pass through the gates which are conditioned to open, means between each pair of registers to transfer information from one register to the next upon the receipt of a control pulse, and means for connecting the output of the individual sensing gate of one register to the transfer mans of that register.

3. The system defined in claim 1 wherein said storage means comprises several information storage positions for several individual requests, and wherein said sensing means comprises a single sensing coincidence gate for each information position, means for connecting the individual inputs of said gates to the individual stages of each position so that said gates are conditioned open when all of the stages in its respective position contains zeros.

4. An automatic system for randomly dispensing requests for service in the order in which they are received, said system comprising means for storing information representing a plurality of individual service requests, means for applying information representing requests to the input to said storage means, means for sensing the contents of said storage means, control means responsive to the output of said sensing means for controlling the transfer of information representing requests from the input of said storage means to the output of said storage means, and means connected to the output of said storage means for recovering on demand the information representing requests in the order in which they are applied to the input, said storage means comprising a plurality of word registers, each of said registers comprising a plurality of separate stages and containing information representing a single request, means for connecting said registers in cascade, said cascade connecting means including transfer means connected between the outputs of one register and the inputs of the next adjacent register, sensing means for each register connected to the output of that register for conditioning said transfer means connected to the input of that register for transfer of information into that register when said sensing means for that register senses all zeros in that register, and means for applying control pulses to said transfer means for causing the transfer of information into these registers which contain nothing but zeros.

5. The system defined in claim 4 wherein said word registers comprise individual stages, each of said stages comprising a controlled device, the transfer of information into each stage being accomplished in response to a control signal for connecting the output of one register to the input of the next adjacent register to form a register chain, said transfer means blocking the transfer of information from one register to another until appropriate control signals are received thereby, separate sensing means connected to the output of each register for generating a first control signal when that register is empty, means for connecting the output of each of said sensing means to that transfer means which is connected to the input of the same register to which said sensing means is connected so that each of said sensing means and transfer means forms a loop between the output of a register and its input, and means for applying to each of said transfer means a second periodic control signal to cause any transfer means receiving both of said first and second control signals to transfer information contained in the register connected to the input of that transfer means into the register connected to the output of said transfer means.

6. An automatic system for dispensing requests for service in the order in which such requests are made, said system comprising a bank of individual information storage devices, means for connecting said storage devices into a plurality of parallel connected word registers, means for connecting said word registers in cascade so that information can be transferred from one to the other in sequence, said connecting means including controllable transfer means connected between the output of one word register and the input of an adjacent register, zero sensing gates for each register, means for connecting the inputs of each sensing gate to the outputs of its associated means for connecting the inputs of each sensing gate to the outputs of its associated register so that said gate is conditioned open when the associated register contains only zeros, means for applying control signals to another of the inputs of said sensing gates, means for connecting the outputs from the individual sensing gates to the control inputs of the said transfer means connected to the input of the associated register so that control signals can pass through those sensing gates which are conditioned open to the appropriate transfer means to cause the transfer of information into the appropriate word registers from the preceding registers, means for applying information representative of requests to the input to the bank, and means for withdrawing information representing requests from the output of the bank in the order in which they were presented and at random times.

7. A self-controlling shifting memory device which receives digital information at one end and automatically shifts that information to the other end under internal control, said memory comprising a plurality of parallel connected registers, each of said registers having a storage capacity for a single information word, transfer means for connecting the output of one register to the input of the next adjacent register to form a register chain, said transfer means blocking the transfer of information from one register to another until appropriate control signals are received thereby, separate sensing means connected to the output of each register for generating a first control signal when that register is empty, means for connecting the output of each of said sensing means to that transfer means which is connected to the input of the same register to which said sensing means is connected so that each of said sensing means and transfer means forms a loop between the output of a register and its input, and means for applying to each of said transfer means a second periodic control signal to cause any transfer means receiving both of said first and second control signals to transfer information contained in the register connected to the input of that transfer means into the register connected to the output of said transfer means.

8. The device defined in claim 7 further including means connected to the output of the last register in said chain for receiving on demand information stored therein, and further including means connected to said last register in said chain for applying a clear signal to said register to empty said register when the information stored therein has been received at its output.